United States Patent [19]

Chuu et al.

[11] Patent Number: 5,087,459
[45] Date of Patent: Feb. 11, 1992

[54] NON-TACK CHEWING GUM BASE

[75] Inventors: Michael S. Chuu, Northbrook; Albert H. Chapdelaine, Naperville; Mansukh M. Patel, Downers Grove, all of Ill.

[73] Assignee: Wm. Wrigley Jr. Company, Chicago, Ill.

[21] Appl. No.: 673,862

[22] Filed: Mar. 21, 1991

Related U.S. Application Data

[63] Continuation of Ser. No. 417,165, Oct. 4, 1989, abandoned.

[51] Int. Cl.⁵ ............................... A23G 3/30
[52] U.S. Cl. ................................ 426/4; 426/6
[58] Field of Search ........................ 426/3-6

[56] References Cited

U.S. PATENT DOCUMENTS

| | | | |
|---|---|---|---|
| 2,357,811 | 9/1944 | Corkery et al. | 426/4 |
| 3,984,574 | 10/1976 | Comollo | 426/4 |
| BI 4,352,822 | 9/1985 | Cherukuri et al. | 426/4 |
| 4,352,823 | 10/1982 | Cherukuri et al. | 426/4 |
| 4,387,108 | 6/1983 | Kock et al. | 426/4 |
| 4,415,593 | 11/1983 | Glass et al. | 426/4 |
| 4,452,820 | 6/1984 | D'Amelia et al. | 426/4 |
| 4,518,615 | 5/1985 | Cherukuri et al. | 426/4 |

FOREIGN PATENT DOCUMENTS

| | | |
|---|---|---|
| 67665 | 12/1982 | European Pat. Off. |
| 134120 | 3/1985 | European Pat. Off. |
| 0271445 | 6/1988 | European Pat. Off. . |
| 5519014 | 6/1986 | Japan . |

Primary Examiner—Jeanette Hunter
Attorney, Agent, or Firm—Ralph J. Gabric

[57] ABSTRACT

A non-tack chewing gum composition having improved flavor and texture quality is provided wherein the chewing gum has a gum base comprising from about 0.1% to about 20% by weight terpene resin; from about 0.1% to about 10% by weight high melting wax; from about 0.1% to about 4% by weight low melting wax; from about 10% to about 30% by weight elastomer; from about 15% to about 30% by weight polyvinyl acetate; from about 1% to about 10% by weight emulsifier; from about 5% to about 20% by weight filler; and from about 15% to about 40% by weight gum base solvent.

24 Claims, 1 Drawing Sheet

NON-TACK CHEWING GUM BASE

This application is a continuation of application Ser. No. 417,165, filed Oct. 4, 1989, now abandoned.

BACKGROUND OF THE INVENTION

The present disclosure is directed to a novel chewing gum formulation which exhibits non-tack characteristics while retaining texture and flavor character. In the past, chewing gums having non-tack characteristics have generated much interest. The demand for chewing gum compositions which do not adhere to natural teeth, dentures, fillings, or the like is certainly understandable.

Various approaches have been undertaken to address the tackiness problem often manifested by conventional chewing gums. These approaches often involve the modification of well known gum base formulations, either by the deletion of certain ingredients or by the inclusion of additional ingredients. For background information with respect to these prior art non-tack gum compositions, see U.S. Pat. Nos. 4,518,615 and 4,415,593.

Unfortunately, the prior art approaches to reduce tackiness, although successful to some degree, often present new problems. For example, the prior art approaches to reducing tackiness can involve expensive modifications to the chewing gum manufacturing process. Additionally, the prior art non-tack chewing gums suffer from inferior texture quality and flavor character.

It would therefore be desirable to develop a non-tack chewing gum base composition which also maintains its texture quality, as well as its flavor character. Additionally, it would be desirable that such a non-tack chewing gum with improved texture quality and flavor character could be manufactured according to a manufacturing method that is not dependent on expensive or critical manufacturing parameters.

SUMMARY OF THE PRESENT INVENTION

It has been unexpectedly discovered that when a low melting wax is employed in a terpene resin containing chewing gum base, the chewing gum manifests superior non-tack properties while maintaining its texture quality and flavor character. In accordance with the present invention, there is provided a chewing gum base and a method of manufacturing the same comprising terpene resins and a low melting point wax. When the chewing gum base of the present invention is employed in a chewing gum the chewing gum manifests non-tack characteristics while maintaining its texture quality and flavor character. Additionally, the chewing gum base of the present invention can be manufactured pursuant to manufacturing methods well known in the art, and, thus, there is no need to make expensive modifications, or to follow critical parameters, in the manufacture of the chewing gum base of the present invention.

The chewing gum base of the present invention comprises terpene resin in an amount form about 0.1% to about 20% by weight of the gum base. The terpene resin will have a melting point between about 85° C. to about 135° C. The gum base will further comprise one or more high softening waxes in an amount from about 0.1% to about 10% by weight of the gum base wherein the high melting wax has a melting point of about 70° C. or greater. According to the invention, the combined amount of terpene resin and high melting wax present in the gum base will be from about 0.1% to about 20% by weight of the gum base wherein the ratio of terpene resin to high melting wax will be between about 3:1 to about 1:3 by weight. Additionally, the chewing gum base of the present invention will have a low melting wax present in an amount from about 0.1% to about 4% by weight of the gum base wherein the low melting wax has a melting point of about 50° C. or less. The gum base will further have elastomers present in an amount from about 10% to about 30% by weight of the gum base. The gum base will also contain polyvinyl acetate in an amount from about 15% to about 30% by weight wherein the polyvinyl acetate has a molecular weight of about 8,000 to about 60,000. Also, the chewing gum base will have emulsifiers present in an amount from about 1% to about 10% by weight. Fillers will also be present in an amount from about 5% to about 20% by weight of the gum base. Finally, the chewing gum base of the present invention will have a gum base solvent present in an amount from about 15% to about 40% by weight of the gum base.

DETAILED DESCRIPTION OF PREFERRED EMBODIMENTS

Figure 1:
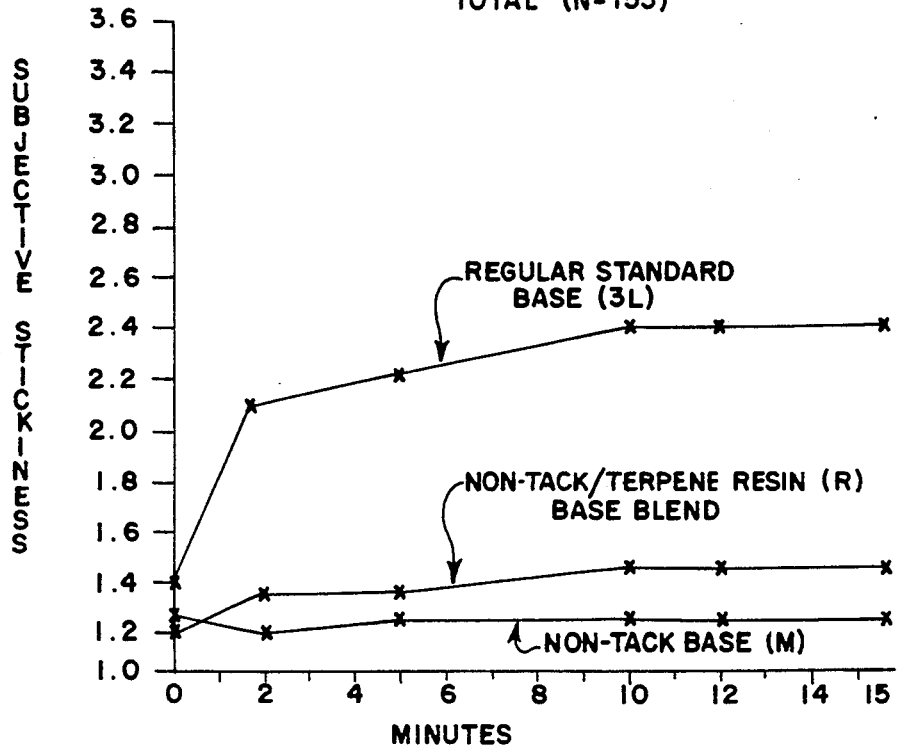
FIG. 1 is a graph of the subjective stickiness over time of: gum (R) utilizing the gum base of this invention; gum (M) utilizing a non-tack gum base known in the art; and gum (3L) utilizing a standard gum base known in the art.
Figure 2:
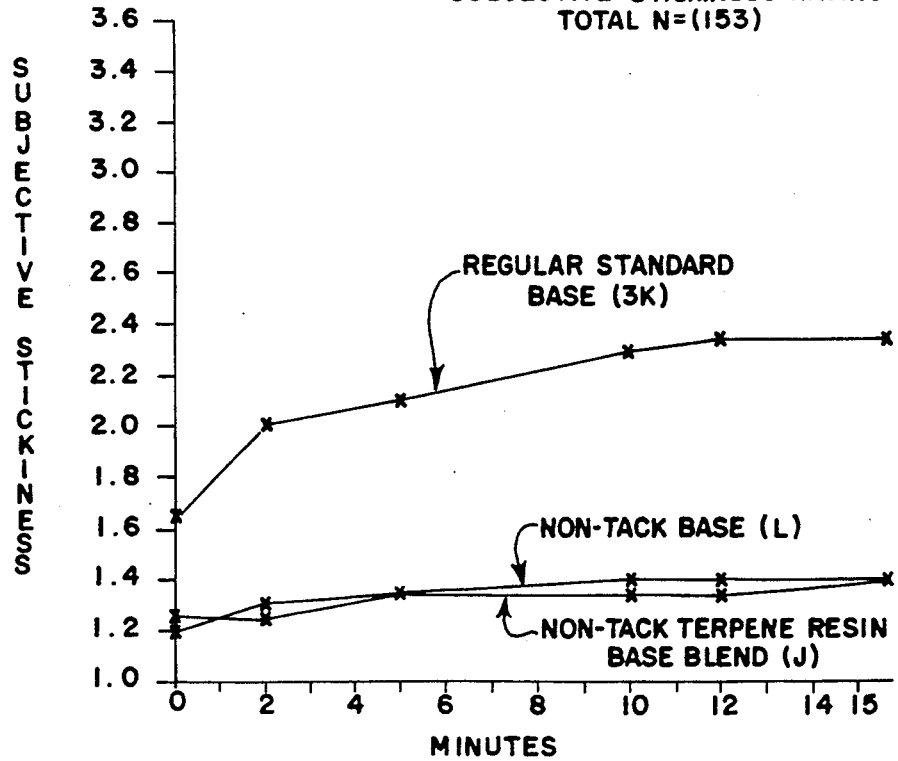
FIG. 2 is a graph of the subjective stickiness over time of: gum (J) utilizing the gum base of this invention; gum (L) utilizing a non-tack gum base known in the art; and gum (3K) utilizing a standard gum base known in the art.

In general, a chewing gum composition comprises a water-soluble bulk portion, a water-insoluble chewable gum base portion, and, typically, water-insoluble flavors. The water-soluble bulk portion dissipates with the portion of the flavor over a period of time during chewing. The gum base portion is retained in the mouth throughout the chew. The present invention is directed to the base portion of the chewing gum.

In accordance with the present invention, a non-tack chewing gum having improved texture quality and flavor character over prior art non-tack chewing gums has been discovered. Specifically, a new and improved non-tack chewing gum base has been discovered. The chewing gum base of the present invention comprises: terpene resins; one or more high melting waxes; a low melting wax; one or more fillers; one or more elastomers; one or more emulsifiers; low molecular weight polyvinyl acetate, and a solvent for the chewing gum base.

The first important ingredient of the chewing gum base of the present invention are terpene resins. For a discussion of terpene resins and their use in chewing gum see "USE OF TERPENE RESINS AS BASIC CHEWING GUM COMPONENTS" by Y. Sato and Y. Suzuki in SHOKU NO KAGAKU, Vol. 93, 1985. Terpene resins contemplated by the chewing gum base of the present invention have high softening points. The terpene resins contemplated by the present invention will have softening points of about 85° C. to about 135° C., and preferably of about 85° C. about 125° C. Terpene resins with lower softening points will yield a chewing gum base that is too soft and, thus, less desirable. Conversely, terpene resins with higher softening points will yield a chewing gum base that is tougher thereby requiring additional plasticizers such as waxes, fats, oils, and emulsifiers. The preferred terpene resins contemplated by the chewing gum base of the present invention include polyterpene resins available from Hercules, Inc.; Reichold Co.; and Arizona Chemical, a division of Kraft. The terpene resins contemplated by the present invention will be present in amounts by weight of the chewing gum base composition from about 0.1% to about 20%, and preferably, from about 5% to about 15% by weight.

High melting waxes contemplated by the present invention include: candelilla wax, paraffin wax, carnauba wax, microcrystalline wax, and the like. The preferred wax contemplated by chewing gum base of the present invention is microcrystalline wax. By high melting waxes it is meant waxes with a melting point of about 70° C. or greater. The high melting waxes will be present in an amount from about 0.1% to about 10% by weight of the chewing gum base composition. Preferably, the waxes will comprise from about 4% to about 8% by weight of the chewing gum base composition.

According to the invention, the combined amount of terpene resin and high melting wax present in the chewing gum base of the present invention is from about 0.1% to about 20% by weight of the chewing gum base composition, wherein the ratio of terpene resin to high melting wax is from about 3:1 to about 1:3 by weight. Preferably, the total amount of terpene resin and high melting wax present in the chewing gum base of the present invention is from about 4% to about 20% by weight of the chewing gum base composition, wherein the ratio of terpene resin to high melting wax is from about 3:1 to about 1:1 by weight.

In addition to high melting wax, the chewing gum base of the present invention contemplates the use of low melting wax. The use of low melting wax serves to soften the texture; increase the liveliness of the chew, as well as to maintain the gum's cohesiveness; maintains the soft initial chew of the gum throughout its shelf-life; and extends the gum's flavor and sweetness. Without being restricted by theory, it is believed that the low melting wax prevents the gum base ingredients, as for example, the high melting wax, from crystallizing, thereby allowing for a more amorphous gum, which may account for the chewing gum's superior texture quality and flavor character over the non-tack chewing gum compositions presently known in the art.

The low melting point waxes contemplated by the present invention include waxes with a melting point of about 50° C. or less. The preferred low melting wax contemplated by the chewing gum base of the present invention is a paraffin wax with a melting point of about 46° C. available from Boler Petroleum Co. under the name "1397 wax". The low melting wax will comprise from about 0.1% to about 4% by weight of the gum base composition. Preferably, the low melting wax of the present invention will comprise from about 0.1% to about 2% by weight of the chewing gum base composition.

The elastomers contemplated by the chewing gum base of the present invention include synthetic gums or synthetic elastomers. Illustrative synthetic elastomers are butadiene-styrene copolymers, polyisobutylene, and isobutylene-isoprene copolymer. Preferably, polyisobutylene, isobutylene-isoprene copolymer, or mixtures thereof are employed. Most preferably, the elastomer utilized in the chewing gum base of the present invention comprises a mixture of isobutylene-isoprene copolymer and polyisobutylene wherein the ratio of isobutylene-isoprene copolymer to polyisobutylene is from about 3:1 to about 1:3 by weight.

The elastomer is employed in an amount from about 10% to about 30% by weight of the chewing gum base. Preferably, the elastomer will be present in an amount from about 15% to about 25% by weight of the chewing gum base composition.

The chewing gum base of the present invention also contemplates the use of low molecular weight polyvinyl acetate as a plasticizer. The low molecular weight polyvinyl acetate contemplated by the chewing gum base of the present invention will have a molecular weight of about 8,000 to about 60,000. The polyvinyl acetate will be present in an amount from about 15% to about 30% by weight of the chewing gum base. Preferably, the polyvinyl acetate will be present in the chewing gum base from about 20% to about 25% by weight of the chewing gum base.

Emulsifiers contemplated by the present invention include glycerol monostearate, lecithin, fatty acid monoglycerides, diglycerides, triglycerides, and the like, as well as mixtures thereof. Glycerol monostearate is preferred however. The emulsifiers will be present in an amount from about 1% to about 10% by weight of the chewing gum base composition. Preferably, the emulsifiers will comprise from about 2% to about 8% by weight of the chewing gum base.

The fillers contemplated by the chewing gum base of the present invention include calcium carbonate, magnesium carbonate, talc, tricalcium phosphate, and the like, as well as mixtures thereof. Preferably, the present invention contemplates the use of calcium carbonate as the filler. The filler will comprise from about 5% to about 20% by weight of the chewing gum base composition. Preferably, the filler will be present in an amount from about 10% to about 15% of the chewing gum bas composition.

The chewing gum base of the present invention also contemplates the use of a chewing gum base solvent. Illustrative of solvents typically employed in chewing gum bases are: partially hydrogenated vegetable oil; partially hydrogenated soy bean oil; glycerol monostearate; hydrogenated cottonseed oil; and mixtures thereof. Preferably, the solvent contemplated by the chewing gum base of the present invention is a mixture of hydrogenated oils and glycerol monostearate wherein the ratio of hydrogenated oils to glycerol monostearate is about 40:1 to about 2:1 by weight. The chewing gum base solvent will comprise from about 15% to about 40% by weight of the chewing gum base, and preferably, the chewing gum base solvent will comprise from about 20% to about 30% by weight of the chewing gum base composition.

Optionally, the gum base of the present invention may contain antioxidants in an amount from about 0.01% to about 0.1% by weight of the chewing gum base composition. Common antioxidants include Butylhydroxide Anisole (BHA) and Butylhydroxide Toluene (BHT). In a preferred embodiment of the present invention, the chewing gum base will contain BHA.

As previously pointed out, a chewing gum composition generally comprises a water-soluble bulk portion, a water-insoluble chewable gum base portion, and, typically, water-insoluble flavors. The water-soluble bulk portion dissipates with the portion of the flavor over a period of time during chewing. The gum base portion is retained in the mouth throughout the chew.

The manner in which the base ingredients of the present invention are blended is not critical and is performed using standard techniques and equipment known to those skilled in the art. Typically, a portion of the terpene resin and a portion of filler will be mixed with the elastomers in a Sigma blade mixer at a temperature of about 105° C. to about 115° C. for about 2-3 hours, thereby yielding a homogenous mixture of the aforesaid. Once the previously described mixing has taken place, the remaining base ingredients may be added in bulk, incrementally or stepwise, while the resulting mixture is mixed until homogenous.

A wide variety of different types of manufacturing methods and apparatii are well known to those skilled in the art, and the instant invention is not intended to be limited to a specific mixer, or a specific mixing temperature, or a specific length of mixing time. These features are well known to those skilled in the art.

The insoluble gum base comprises between about 5% to about 95% of the final chewing gum compositions. Preferably, the insoluble gum base comprises about 10% to about 50% of the gum composition by weight, and most preferably, about 20% to about 30% by weight of the gum.

The water soluble portion of the chewing gum may comprise softeners, sweeteners and combinations thereof. The softeners are added to the chewing gum in order to optimize chewability and mouth feel of the gum. Softeners, also known in the art as plasticizers or plasticizing agents, generally constitute between about 0.5% to about 15% by weight of the chewing gum. Softeners may include glycerine, lecithin and combinations thereof. Further, aqueous sweetener solutions such as those containing sorbitol, hydrogenated starch hydrolysates, corn syrup and combinations thereof may be used as softeners and binding agents in the gum.

Chewing gum may also contain sweeteners. Such sweeteners are also contemplated by the present invention for addition to the chewing gum. The sweeteners include both sugar and sugarless components. Sugar sweeteners generally include saccharide containing components commonly known in the chewing gum art which comprise, but are not limited to, sucrose, dextrose, maltose, dextrin, dried invert sugar, fructose, levulose, galactose, corn syrup solids, and the like, alone or in any combination. Sugarless sweeteners include components with sweetening characteristics but which are devoid of the commonly known sugars and comprise, but are not limited to, sugar alcohols such as sorbitol, mannitol, xylitol, hydrogenated starch hydrolysates, maltitol, and the like, alone or in any combination. Also contemplated for addition to the chewing gum are high intensity sweeteners such as aspartame, sucralose, acesulfame-K, and saccharin.

Those skilled in the art will recognize any combination of sugar and/or sugarless sweeteners may be incorporated into the chewing gum formula. Further, those skilled in the art will recognize that a sweetener may be present in a chewing gum in whole or in part as a water soluble bulking agent. In addition, the softener may be combined with a sweetener such as an aqueous sweetener solution.

A flavor may be present in a chewing gum in an amount from about 0.1% to about 10% by weight, and preferably from about 0.5% to about 3% by weight of the gum. Flavors contemplated by the present invention include any food acceptable liquid flavoring. The flavor may comprise essential oils, synthetic flavors, or mixtures thereof, including but not limited to, oils derived from plants and fruits such as citrus oils, fruit essences, peppermint oil, spearmint oil, clove oil, oil of wintergreen, anise, and the like. Artificial flavoring components are also contemplated by the present invention. Those skilled in the art will recognize that natural and artificial flavors may be combined in any manner. All such flavors and blends are contemplated by the present invention.

Additional ingredients such as colors and pharmaceutical agents may be added to the chewing gum.

In general, chewing gum is manufactured by sequentially adding the various chewing gum ingredients to any commercially available mixer known in the art. After the ingredients have been thoroughly mixed, the gum mix is discharged from the mixer and shaped to the desired form such as by rolling into sheets and cutting into sticks, extruding into chunks, or casting into pellets.

Generally, the ingredients are mixed by first melting the gum base and adding it to the running mixer. The base may also be melted in the mixer itself. Color may also be added at this time. A softener such as glycerine may then be added next along with syrup and a portion of bulking agent. Further portions of the bulking agents may be added to the mixer.

The entire mixing procedure typically takes from about 5 to about 15 minutes, but longer mixing times may sometimes be required. Those skilled in the art will recognize that variations to the above-described procedure may be employed. It should be understood that an equivalent of changes and modifications of the embodiments described above are also contemplated by the present invention.

The following examples are not to be construed as limitations upon the present invention, but are included merely as illustration of the various embodiments.

EXAMPLES

Three gum bases were made according to the following formulations:

TABLE I

| COMPONENT | GUM BASE 1 | GUM BASE 2 | GUM BASE 3 |
| --- | --- | --- | --- |
| Microcrystalline Wax (82° C. melting point) | 6.1 | 9.8% | — |
| Paraffin Wax (82° C. melting point) | — | 2.0% | — |
| BHA | 0.04% | — | 0.04% |
| Terpene Resin (125° C. softening point) | 13.66% | — | — |
| Natural Gums | — | 18.5% | — |
| Resin Esters | — | 17.0% | — |
| Paraffin Wax (46° C. melting point) | 0.2% | — | — |
| Hydrogenated Cottonseed Oil | 10.1% | 3.2% | 13.3% |
| Hydrogenated Soybean Oil | 6.8% | 2.4% | 13.3% |
| Hydrogenated Vegetable Oil | 1.9% | 0.6% | 9.86% |
| Glycerol monostearate | 5.6% | 5.4% | 2.7% |
| Low molecular weight polyvinyl acetate | 24.7% | 15.7% | 21.7% |
| $CaCO_3$ | 10.7% | 16.2% | 13.3% |
| Polyisobutylene | 10.1% | 3.0% | 15.9% |
| Isoprene-Isobutylene Copolymer | 10.1% | 6.2% | 9.9% |
| | 100% | 100% | 100% |

Gum base formulation number 1 above is the low melting wax/terpene resin containing non-tack gum base of the present invention. Gum base formulation number 2 above is a standard gum base formulation known in the prior art. Similarly, gum base formulation number 3 above is a non-tack gum base formulation known in the prior art.

Example 1

The gum base compositions of TABLE I were used to make the following spearmint flavored chewing gum composition according to the following formulations:

TABLE II

| COMPONENT | R | M | 3L |
|---|---|---|---|
| Gum Base 1 (see Table I) | 19.2% | — | — |
| Gum Base 2 (see Table I) | — | — | 20.7% |
| Gum Base 3 (see Table I) | — | 19.8% | — |
| Sorbitol | 0.7% | 0.7% | — |
| Corn Syrup | 14.8% | 17.4% | 16.9% |
| Glycerin | 1.3% | 0.7% | 0.9% |
| Spearmint Flavor | 1.1% | 0.6% | 0.6% |
| Sugar | 62.7% | 60.8% | 59.4% |
| Lecithin | 0.15% | — | — |
| Color | 0.05% | — | — |
| Dextrose Monohydrate | — | — | 1.5% |
|  | 100% | 100% | 100% |

Spearmint chewing gum "R" above employs the low melting wax/terpene resin non-tack chewing gum base of the present invention (see TABLE I, number 1). Spearmint chewing gum "M" employs a non-tack gum base well known in the prior art (see TABLE I, number 3). Spearmint chewing gum "3L" employs a standard chewing gum base well known in the prior art (see TABLE I, number 2). Upon reviewing FIGURE I, comparing the above three spearmint chewing gum formulations with respect to tackiness over time, it can be observed that the low melting wax/terpene resin chewing gum base manifested non-tack characteristics equivalent to the non-tack chewing gum base known in the prior art. Additionally, however, when the low melting wax/terpene resin containing non-tack gum base of the present invention is employed in spearmint chewing gum, the gum manifests superior texture and flavor character over chewing gum containing the non-tack base known in the prior art.

Example 2

The gum base compositions of TABLE I were used to make the following peppermint flavored gum compositions according to the following formulations:

TABLE III

| COMPONENT | J | L | 3K |
|---|---|---|---|
| Gum Base 1 (see Table I) | 19.3% | — | — |
| Gum Base 2 (see Table I) | — | — | 20.2% |
| Gum Base 3 (see Table I) | — | 20.2% | — |
| Sorbitol | 0.9% | 0.9% | — |
| Corn Syrup | 14.8% | 17.8% | 13.3% |
| Glycerin | 1.3% | 0.7% | 1.3% |
| Sugar | 62.4% | 59.7% | 54.4% |
| Peppermint Flavor | 1.15% | 0.7% | 0.9% |
| Lecithin | 0.15% | — | — |
| Dextrose Monohydrate | — | — | 9.9% |
|  | 100% | 100% | 100% |

Peppermint chewing gum "J" above employs the low melting wax/terpene resin non-tack chewing gum base of the present invention (see TABLE I, number 1). Peppermint chewing gum "L" above employs a non-tack gum base well known in the prior art (see TABLE I, number 3). Peppermint chewing gum "3K" above employs a standard gum base known in the prior art (see TABLE I, number 2). Upon reviewing FIGURE II comparing the above three peppermint chewing gum formulations with respect to tackiness over time, it can be seen that the low melting wax/terpene resin chewing gum base containing gum manifested non-tack characteristics equivalent to the gum containing the non-tack gum base known in the prior art. Additionally, however, when the low melting wax/terpene resin containing non-tack gum base of the present invention is employed in peppermint chewing gum, the gum manifests superior texture and flavor character over peppermint chewing gum containing the non-tack base known in the prior art.

Example 3

A gum base composition was made according to the following formula in TABLE IV below:

TABLE IV

| COMPONENT | GUM BASE |
|---|---|
| Microcystalline Wax (82° C. melting point) | 4.9% |
| Terpene Resin (85° C. softening point) | 13.6% |
| Paraffin Wax (46° C. melting point) | 1.3% |
| Hydrogenated cottonseed, soybean, and vegetable oils | 19.2% |
| Glycerol Monostearate | 3.8% |
| Low Molecular weight polyvinyl acetate | 24.7% |
| CaCO$_3$ | 11.0% |
| Lecithin | 1.3% |
| Polyisobutylene | 10.1% |
| Isoprene-Isobutylene Copolymer | 10.1% |
|  | 100% |

The gum base composition of TABLE IV was used to make the peppermint gum composition of TABLE V below:

TABLE V

| COMPONENT |  |
|---|---|
| Base | 20.2% |
| Sugar | 58.5% |
| Corn Syrup | 18.8% |
| Sorbitol | 0.7% |
| Glycerin | 0.7% |
| Peppermint Flavor | 1.1% |
|  | 100% |

In laboratory panel tests assessing the tackiness of the peppermint gum formulation of TABLE V, it was determined that this gum formulation was similar in non-tack properties to gum formulation "L" of TABLE III, which employs a non-tack gum base known in the prior art. However, when the low melting wax/terpene resin containing non-tack gum base of the present invention is employed in peppermint chewing gum, peppermint gum formulations containing the gum base of the present invention manifest texture and flavor quality superior to peppermint gums containing non-tack gum bases known in the prior art.

We claim:

1. A chewing gum base comprising:
   terpene resin in an amount from about 0.1% to about 20% by weight of the gum base wherein the terpene resin has a softening point of about 85° C. to about 135° C.;

one or more high melting waxes in an amount from about 0.1% to about 10% by weight of the gum base wherein the high melting waxes have a melting point of about 70° C. or greater;

wherein the combined amount of terpene resin and high melting wax present in the chewing gum base is from about 0.1% to about 20% by weight of the gum base and wherein the ratio of terpene resin to high melting wax is from about 3:1 to about 1:3 by weight;

low melting wax in an amount from about 0.1% to about 4% by weight of the gum base wherein the low melting wax has a melting point of about 50° C. or less;

one or more elastomers in an amount from about 10% to about 30% by weight of the gum base;

low molecular weight polyvinyl acetate in an amount from about 15% to about 30% by weight of the gum base wherein the polyvinyl acetate has a molecular weight of about 8,000 to about 60,000;

one or more emulsifiers in an amount from 1% to about 10% by weight of the gum base;

one or more fillers in an amount from about 5% to about 20% by weight of the gum base; and one or more chewing gum base solvents in an amount from about 15% to about 40% by weight of the gum base.

2. The chewing gum composition of claim 1 wherein the low melting wax comprises a paraffin wax.

3. The chewing gum composition of claim 1 wherein the elastomer is selected from the group consisting of butadiene-styrene copolymers; polyisobutylene; isobutylene-isoprene copolymer; and mixtures thereof.

4. The chewing gum composition of claim 1 wherein the elastomer comprises a mixture of isobutylene-isoprene copolymer and polyisobutylene wherein the ratio of the isoprene-isobutylene copolymer to polyisobutylene is from about 3:1 to about 1:3 by weight.

5. The chewing gum composition of claim 1 wherein the emulsifier comprises glycerol monostearate.

6. The chewing gum composition of claim 1 wherein the filler comprises calcium carbonate.

7. The chewing gum composition of claim 1 wherein the gum base solvent is selected from the group consisting of: partially hydrogenated vegetable oil; partially hydrogenated soybean oil; glycerol monostearates; hydrogenated cottonseed oil; and mixtures thereof.

8. The chewing gum composition of claim 1 wherein the gum base solvent comprises a mixture of hydrogenated oil and glycerol monostearate wherein the ratio of hydrogenated oil to glycerol monostearate is about 40:1 to about 2:1 by weight.

9. A chewing gum base comprising:
terpene resin in an amount from about 5% to about 15% by weight of the gum base wherein the terpene resin has a softening point of about 85° C. to about 125° C.;

one or more high melting waxes in an amount from about 4% to about 8% by weight of the gum base wherein the high melting waxes have a melting point of about 70° C. or greater;

wherein the combined amount of terpene resin and high melting wax present in chewing gum base is from about 4% to about 20% by weight of the gum base and wherein the ratio of terpene resin to high melting wax is from about 3:1 to about 1:1 by weight;

low melting wax in an amount from about 0.1% to about 2% by weight of the gum base wherein the low melting wax has a melting point of about 50° C. or less;

one or more elastomers in an amount from about 15% to about 25% by weight of the gum base;

low molecular weight polyvinyl acetate in an amount from about 20% to about 25% by weight of the gum base wherein the polyvinyl acetate has a molecular weight of about 8,000 to about 60,000;

one or more emulsifiers in an amount from about 2% to about 8% by weight of the gum base;

one or more fillers in an amount from about 10% to about 15% by weight of the gum base; and one or more chewing gum base solvents in an amount from about 20% to about 30% by weight of the gum base.

10. The chewing gum composition of claim 9 wherein the low melting wax comprises a paraffin wax.

11. The chewing gum composition of claim 9 wherein the elastomer is selected from the group consisting of: butadiene-styrene copolymers; polyisobutylene; isobutylene-isoprene copolymer; and mixtures thereof.

12. The chewing gum composition of claim 9 wherein the elastomer comprises a mixture of isobutylene-isoprene copolymer and polyisobutylene wherein the ratio of the isoprene-isobutylene copolymer to polyisobutylene is from about 3:1 to about 1:3 by weight.

13. The chewing gum composition of claim 9 wherein the emulsifier comprises glycerol monostearate.

14. The chewing gum composition of claim 9 wherein the filler comprises calcium carbonate.

15. The chewing gum composition of claim 9 wherein the gum base solvent is selected from the group consisting of: partially hydrogenated vegetable oil; partially hydrogenated soy bean oil; glycerol monostearate; and hydrogenated cottonseed oil.

16. The chewing gum composition of claim 9 wherein the gum base solvent comprises a mixture of hydrogenated oil and glycerol monostearate wherein the ratio of hydrogenated oil to glycerol monostearate is about 40:1 to about 2:1 by weight.

17. A method of manufacturing a non-tack chewing gum base comprising the following steps:
providing a terpene resin with a softening point of about 85° C. to about 135° C.;

providing one or more high melting waxes with a melting point of about 70° C. or greater;

providing low melting wax with a melting point of about 50° C. or less;

providing one or more elastomers;

providing low molecular weight polyvinyl acetate with a molecular weight of about 8,000 to about 60,000;

providing one or more emulsifiers;

providing one or more fillers;

providing one or more chewing gum base solvents; and mixing the aforesaid so that the resulting non-tack chewing gum base comprises from about 0.1% to about 20% by weight terpene resin; from about 0.1% to about 10% by weight high melting waxes; such that the total amount of terpene resin and high melting wax is from about 0.1% to about 20% by weight wherein the ration of terpene resin to high melting wax is from about 3:1 to about 1:3 by weight; from about 0.1% to about 4% low melting wax by weight; from about 10% to about 30% by weight polyvinyl acetate; from about 1% to about 10% by weight emulsifier; from about 5% to about 20% by weight filler; and from about 15% to about 40% by weight chewing gum base solvents.

18. The method of claim 17 wherein the low melting wax comprises a paraffin wax.

19. The method of claim 17 wherein the elastomer is selected from the group consisting of: butadiene-styrene copolymers; polyisobutylene; isobutylene-isoprene copolymer; and mixtures thereof.

20. The method of claim 17 wherein the elastomer comprises a mixture of isobutylene-isoprene copolymer and polyisobutylene wherein the ratio of the isoprene-isobutylene copolymer to polyisobutylene is from about 3:1 to about 1:3 by weight.

21. The method of claim 17 wherein the emulsifier comprises glycerol monostearate.

22. The method of claim 17 wherein the filler comprises calcium carbonate.

23. The method of claim 17 wherein the gum base solvent is selected from the group consisting of: partially hydrogenated vegetable oil; partially hydrogenated soybean oil; glycerol monostearate; hydrogenated cottonseed oil; and mixtures thereof.

24. The method of claim 17 wherein the gum base solvent comprises a mixture of hydrogenated oil and glycerol monostearate wherein the ratio of hydrogenated oil to glycerol monostearate is about 40:1 to about 2:1 by weight.

* * * * *

UNITED STATES PATENT AND TRADEMARK OFFICE
CERTIFICATE OF CORRECTION

PATENT NO. : 5,087,459
DATED : February 11, 1992
INVENTOR(S) : Michael S. Chuu et al.

Page 1 of 3

It is certified that error appears in the above-identified patent and that said Letters Patent is hereby corrected as shown below:

On the title page: Item [56]:

column 1, under the heading "U.S. PATENT DOCUMENTS", before "4,352,822" please delete "BI" and substitute therefor --B1--; on the line following "4,352,823  10/1982  Cherukuri et al. ......... 426/4" insert --4,241,091  12/1980  Stroz et al. ............. 426/4--; in column 2, please delete "Kock et al." and substitute therefor --Koch et al.--.

On the title page: column 2, After "Attorney, Agent or Firm" please delete "Ralph J. Gabric" and substitute therefor --Willian Brinks Olds Hofer Gilson & Lione--.

column 1, line 59, please delete "form" and substitute therefor --from--.

UNITED STATES PATENT AND TRADEMARK OFFICE
CERTIFICATE OF CORRECTION

PATENT NO. : 5,087,459

DATED : February 11, 1992

INVENTOR(S) : Michael S. Chuu et al.

It is certified that error appears in the above-identified patent and that said Letters Patent is hereby corrected as shown below:

In column 2, line 65, after "85° C." please insert --to--.

In column 3, line 56, before "gum" please insert --chewing--.

In column 4, line 39, please delete "bas" and substitute therefor --base--.

In column 4, line 45, please delete "soy bean" and substitute therefor --soybean--.

IN THE EXAMPLES

In column 6, first entry in TABLE I under the heading "GUM BASE 1", please delete "6.1" and substitute therefor --6.1%--.

In column 7, line 12, please delete "composition" and substitute therefor --compositions--.

UNITED STATES PATENT AND TRADEMARK OFFICE
CERTIFICATE OF CORRECTION

PATENT NO. : 5,087,459

DATED : February 11, 1992

INVENTOR(S) : Michael S. Chuu et al.

It is certified that error appears in the above-identified patent and that said Letters Patent is hereby corrected as shown below:

Column 10

In claim 15, line 4, please delete "soy bean" and substitute therefor --soybean--.

In claim 17, line 23, please delete "ration" and substitute therefor --ratio--.

Signed and Sealed this

Twelfth Day of October, 1993

BRUCE LEHMAN

Attest:

Attesting Officer

Commissioner of Patents and Trademarks